United States Patent
Wu et al.

(10) Patent No.: US 8,853,993 B2
(45) Date of Patent: Oct. 7, 2014

(54) CONTROL SYSTEM AND CONTROL METHOD OF AN IN-VEHICLE SOLAR ENERGY CHARGER

(75) Inventors: Zhenjie Wu, Shenzhen (CN); Xiaofeng Shen, Shenzhen (CN); Jianhua Zhang, Shenzhen (CN)

(73) Assignee: BYD Company Limited, Shenzhen, Guangdong (CN)

( * ) Notice: Subject to any disclaimer, the term of this patent is extended or adjusted under 35 U.S.C. 154(b) by 452 days.

(21) Appl. No.: 13/246,210

(22) Filed: Sep. 27, 2011

(65) Prior Publication Data
US 2012/0074892 A1    Mar. 29, 2012

(30) Foreign Application Priority Data
Sep. 27, 2010    (CN) .......................... 2010 1 0293257

(51) Int. Cl.
| H01M 10/44 | (2006.01) |
| H01M 10/46 | (2006.01) |
| B60L 11/18 | (2006.01) |
| H02J 7/04 | (2006.01) |
| B60L 8/00 | (2006.01) |

(52) U.S. Cl.
CPC .......... B60L 11/1809 (2013.01); *Y02T 10/7083* (2013.01); *Y02T 10/7094* (2013.01); H02J 7/04 (2013.01); B60L 8/003 (2013.01); *Y02T 90/14* (2013.01); *Y02T 10/7005* (2013.01)
USPC .......................................................... 320/101

(58) Field of Classification Search
CPC ........... H01M 10/46; H02J 7/35; H02J 7/355; H02J 7/0091; H02J 7/0054; H02J 7/04
USPC .......................... 320/101, 103, 104, 128, 150
See application file for complete search history.

(56) References Cited

U.S. PATENT DOCUMENTS

| 2006/0261779 A1* | 11/2006 | Maleus .......................... 320/128 |
| 2011/0068749 A1* | 3/2011 | Maleus .......................... 320/162 |
| 2012/0249047 A1* | 10/2012 | Kelly et al. .................... 320/101 |

FOREIGN PATENT DOCUMENTS

| CN | 201128379 Y | 10/2008 |
| CN | 201511838 U | 6/2010 |
| JP | 3145425 B2 | 3/2001 |
| JP | 2002-240618 A | 8/2002 |
| WO | WO 2010/083435 A1 | 7/2010 |
| WO | WO 2012/041159 A1 | 4/2012 |

OTHER PUBLICATIONS

Frist Office Action dated Jun. 27, 2013 issued in Chinese Application No. 201010293257.2 (7 pages).
Second Office Action dated Jan. 3, 2014 issued in Chinese Application No. 201010293257.2 (6 pages).
PCT International Search Report and Written Opinion mailed Dec. 8, 2011, issued in International Application No. PCT/CN2011/079488 (12 pages).

* cited by examiner

*Primary Examiner* — Edward Tso
(74) *Attorney, Agent, or Firm* — Finnegan, Henderson, Farabow, Garrett & Dunner LLP

(57) ABSTRACT

A control system for an in-vehicle solar energy charger, comprising a solar cell panel, a solar energy charger, a starting battery, a power battery and a controller. The solar energy charger, the starting battery and the power battery are electrically connected to the controller respectively. The controller is configured for performing a maximum photovoltaic power tracking algorithm and controlling an output power of the solar energy charger for charging the power battery or starting battery, according to an input power of the solar energy charger.

14 Claims, 2 Drawing Sheets

CONTROL SYSTEM AND CONTROL METHOD OF AN IN-VEHICLE SOLAR ENERGY CHARGER

CROSS-REFERENCE TO RELATED APPLICATIONS

The present application claims priority to and benefits of Chinese Patent Application No. 201010293257.2 filed with State Intellectual Property Office of China on Sep. 27, 2010, the entirety of which is hereby incorporated by reference.

BACKGROUND

1. Technical Field

The present invention relates to a control system and a control method of an in-vehicle solar energy charger.

2. Description of the Related Art

As it is widely known, a running mileage of an electric vehicle is a very important feature. A power source of the electric vehicle is mainly an in-vehicle power battery. Only if the voltage of the in-vehicle power battery is sufficient, normal operation of the electric vehicle may be ensured. Solar energy has become a new green energy to which people pay more and more attentions. The running mileage of the electric vehicle may be improved due to the application of the solar energy to the electric vehicle.

Referring to the solar energy applied to the electric vehicle, due to the area constraint of a solar panel, an output power of solar cell panels is constrained and a high efficiency of energy conversion becomes an important index for a solar energy charger. At present, control method using an analog device is used in many solar energy chargers. However, the control method using an analog device is totally realized by pure hardware circuits, in which there are some special control chips but corresponding parameters thereof are adjusted according to the actual situation. The adjusted parameters cannot be changed unless devices such as resistances or capacitances are replaced. Therefore, concerning the control method of the analog device, the control system is not flexible enough and the utilization of the solar energy is not high.

SUMMARY

The present invention is related to solving the problem that the solar energy charger adopting the control method using an analog device is not flexible in the prior art. The present invention provides a flexible control system and control method of an in-vehicle solar energy charger.

One embodiment of the present invention provides a control system of an in-vehicle solar energy charger comprising a solar cell panel, a solar energy charger, a starting battery and a power battery. The solar cell panel is electrically connected to the solar energy charger. The starting battery and the power battery are electrically connected to the solar energy charger respectively. The control system of the in-vehicle solar energy charger further comprises a controller. The solar energy charger, the starting battery and the power battery are electrically connected to the controller respectively. The controller is configured for performing a maximum photovoltaic power tracking algorithm and controlling the output power of the solar energy charger to charge the power battery or starting battery, according to the input power of the solar energy charger.

Furthermore, the controller is also configured for controlling the solar energy charger to charge the power battery and starting battery according to the current state of the vehicle and the output power of the solar energy charger.

The controller is set with a predetermined first power. The controller is configured for controlling the solar energy charger to charge the power battery and starting battery according to the relationship of the output power of the solar energy charger and the predetermined first power.

When the vehicle is in a running state, the controller is configured for:

when the output power of the solar energy charger is higher than the predetermined first power, outputting the first PWM signal to control that the solar energy charger enters into a boosting mode to charge the power battery;

when the output power of the solar energy charger is lower than or equal to the predetermined first power, outputting the second PWM signal to control that the solar energy charger enters into a bucking mode to charge the starting battery.

When the vehicle is in a parked state, the controller is configured for:

when the voltage of the starting battery is deficient, outputting a third PWM signal to control that the solar energy charger enters into the bucking mode to charge the starting battery;

when the voltage of the starting battery is sufficient and the output power of the solar energy charger is higher than the predetermined first power, outputting a fourth PWM signal to control that the solar energy charger enters into the boosting mode to charge the power battery.

when the voltage of the starting battery is sufficient and the output power of the solar energy charger is lower than or equal to the predetermined first power, outputting a fifth PWM signal to control that the solar energy charger enters into the boosting mode to charge the power battery with a micro current.

When the controller is set with a second power, the controller is configured for:

when the input power of the solar energy charger is higher than the second power, controlling the solar energy charger to work;

when the input power of the solar energy charger is lower than or equal to the second power, controlling the solar energy charger to stop working.

The control system of the in-vehicle solar energy charger may include a photoresistance. The controller is further configured for controlling whether the solar energy charger is working or not according to the light intensity receipted by the photoresistance.

There may be multiple solar energy cell panels that are connected in parallel and series.

Another embodiment of the present invention provides a control method of the control system of the in-vehicle solar energy charger. The control system of the in-vehicle solar energy charger further comprises a solar energy charger, a power battery and a starting battery; wherein, the control method comprising the following steps:

1) calculating an input power of the solar energy charger;

2) performing a maximum photovoltaic power tracking algorithm and controlling the output power of the solar energy charger to charge the power battery or starting battery, according to the input power of the solar energy charger.

Furthermore, the control method further comprises: controlling the solar energy charger to charge the power battery and starting battery according to a current state of the vehicle and the output power of the solar energy charger.

The control method comprises:

when the vehicle is in a running state, comparing the output power of the solar energy charger with the predetermined first power, and the solar energy charger being controlled to work according to the comparing result;

when the output power of the solar energy charger is higher than or equal to the predetermined first power, outputting a first PWM signal to control that the solar energy charger enters into the boosting mode to charge the power battery.

when the output power of the solar energy charger is lower than or equal to the predetermined first power, outputting a second PWM signal to control that the solar energy charger enters into the bucking mode to charge the starting battery.

Furthermore, the control method comprises:

when the vehicle is in a parked state, judging whether the voltage of the starting battery is sufficient and controlling the solar energy charge to work according to the judging result;

when the voltage of the starting battery is deficient, outputting the third PWM signal to control that the solar energy charger enters into a bucking mode to charge the starting battery;

when the voltage of the starting battery is sufficient and the output power of the solar energy charger is higher than the predetermined first power, outputting a fourth PWM signal to control that the solar energy charger enters into a boosting mode to charge the power battery;

when the voltage of the starting battery is sufficient and the output power of the solar energy charger is lower than or equal to the predetermined first power, outputting a fifth PWM signal to control that the solar energy charger enters into a boosting mode to charge the power battery with a micro current.

Furthermore, the control method comprises:

comparing the input power of the solar energy charger with a predetermined second power and control the solar energy charger to work according to the comparing result;

when the input power of the solar energy charger is higher than the second power, controlling the solar energy charger to work;

when the input power of the solar energy charger is lower than or equal to the second power, controlling the solar energy charger to stop working.

The predetermined first power is 45%~55% of a rated power of the solar energy cell panel and the predetermined second power is 8%~12% of the rated power of the solar energy cell panel.

The control method further comprises a step of collecting a light intensity and controlling the solar energy charger to work according to the light intensity:

when the light intensity reaches a predetermined intensity, controlling the solar energy charger to work;

when the light intensity is lower than the predetermined intensity, controlling the solar energy charger to stop working.

The control method further comprises a step of detecting a temperature of the control system of the solar energy charger and controlling the solar energy charger to work:

when the detected temperature is higher than a predetermined temperature, controlling the solar energy charger to stop working and to alarm;

when the detected temperature is not higher than the predetermined temperature, controlling the solar energy charger to work.

The input power and output power of the solar energy charger may be obtained by following methods:

collecting the input voltage, input current, output voltage and output current of the solar energy charger;

calculating a product of the input voltage and input current of the solar energy charger to obtain the input power and calculating a product of the output voltage and output current of the solar energy charger to obtain the output power.

Referring to the control system and control method of the in-vehicle solar energy charger of the present invention, the controller may perform the maximum photovoltaic power tracking algorithm and control the output power of the solar energy charger to charge the power battery or starting battery, according to the input power of the solar energy charger. Thus, there is no need to replace hardware. Only the control process may be replaced. As a result, the control system for an in-vehicle solar energy charger and the control method are flexible and can realize the maximum output of solar energy.

BRIEF DESCRIPTION OF THE DRAWINGS

These and other aspects and advantages of the invention will become apparent and more readily appreciated from the following descriptions taken in conjunction with the drawings in which.

DETAILED DESCRIPTION

Figure 1:
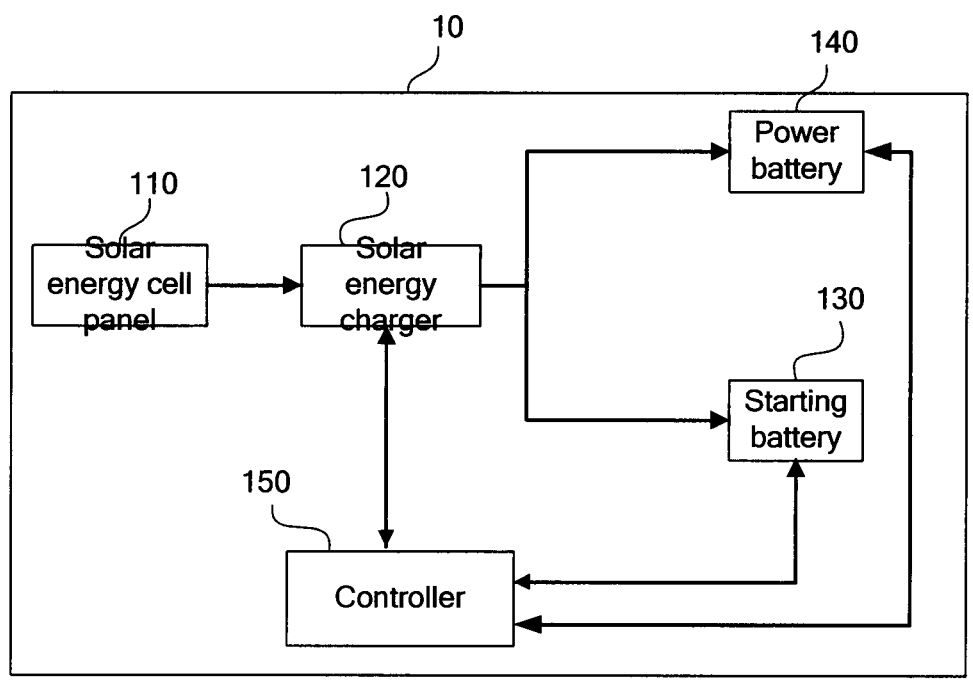
FIG. 1 is a schematic diagram illustrating a control system of an in-vehicle solar energy charger according to an embodiment of the present invention.

Reference will be made in detail to embodiments of the present invention. The embodiments described herein according to drawings are explanatory, illustrative, and used to generally understand the present invention. The embodiments shall not be construed to limit the present invention. The same or similar elements and the elements having same or similar functions are denoted by like reference numerals throughout the descriptions.

As shown in FIG. 1, an embodiment of the present invention provides a control system 10 of an in-vehicle solar energy charger comprising a solar cell panel 110, a solar energy charger 120, a starting battery 130 and a power battery 140. The solar cell panel 110 is electrically connected to the solar energy charger 120. The starting battery 130 and the power battery 140 are electrically connected to the solar energy charger 120 respectively, in which, the control system of the in-vehicle solar energy charger further comprises a controller 150. The solar energy charger 120, the starting battery 130 and the power battery 140 are electrically connected to the controller 150 respectively. The controller 150 is configured for performing a maximum photovoltaic power tracking algorithm and controlling the output power of the solar energy charger 120 to charge the power battery 140 or starting battery 130, according to the input power of the solar energy charger 120.

Furthermore, the controller 150 is also configured for controlling the solar energy charger 120 to charge the power battery 140 and starting battery 130 according to the current state of the vehicle and the output power of the solar energy charger 120.

The solar cell panel 110 may be any kind of solar cell panel 110 which is suitable for use on vehicles. And the area and location of the solar cell panels 110 on the vehicle may be reasonably set according to the size and requirements of vehicle.

Furthermore, the solar cell panels 110 may be multiple which are connected in parallel or in series. For example, multiple solar cell panels 110 may be connected in parallel, and the parallel-connected solar cell panels 110 are connected to other parallel-connected solar cell panels 110 in series. When multiple solar cell panels 110 are connected in series, due to a low current and a high voltage, the signal is weak and the stability of collected signal by the controller 150 is bad. When multiple solar cell panels 110 are connected in parallel, due to a high current and a low voltage, the additional voltage requested for boosting is big. The present invention provides multiple solar cell panels 110 connected in parallel and the parallel-connected panels further connected in series. That ensures sufficient amount of voltage and current. That will be beneficial to processing of samples of the analog signal of the controller.

Generally, the power battery 140 is a power battery 140 pack of a vehicle to supply power source for the vehicle's running. The power battery 140 may be formed by connecting multiple cells in series.

The starting battery 130 is configured for supplying power to electrical apparatus of a vehicle, the voltage is generally 12V. That means, the starting battery 130 may become a storage battery of some usual power supply.

The solar energy charger 120 may be selected from any kind of suitable charger. Due to the difference of the voltages of the starting battery 130 and the power battery 140, the solar energy charger 120 may have a boosting mode and a bucking mode to charge the power battery 140 and the starting battery 130 respectively.

The boosting mode and the bucking mode may be selected from any kind of suitable boosting circuit and bucking circuit. In one embodiment of the present invention, the boosting mode may select the Boost boosting circuit and the bucking mode may select the Buck bucking circuit.

The controller 150 may be selected from any kind of suitable control device. In one embodiment of the present invention, the controller may be a single chip microcomputer or a control chip.

Furthermore, the controller 150 is set with a predetermined first power; the controller 150 is configured for controlling the solar energy charger 120 to charge the power battery 140 and starting battery 130 according to the relationship of the output power of the solar energy charger 120 and the predetermined first power.

When the vehicle is in a running state, the controller 150 is configured for:

when an output power of the solar energy charger 120 is higher than a predetermined first power, outputting a first PWM signal to control that the solar energy charger 120 enters into the boosting mode to charge the power battery 140;

when the output power of the solar energy charger 120 is lower than or equal to the predetermined first power, outputting a second PWM signal to control that the solar energy charger enters into the bucking mode to charge the starting battery 130.

When the vehicle is in a parked state, the controller is configured for:

when the voltage of the starting battery 130 is deficient, outputting a third PWM signal to control that the solar energy charger 120 enters into the bucking mode to charge the starting battery 130;

when the voltage of the starting battery 130 is sufficient and the output power of the solar energy charger 120 is higher than the predetermined first power, outputting a fourth PWM signal to control that the solar energy charger 120 enters into the boosting mode to charge the power battery 140.

when the voltage of the starting battery 130 is sufficient and the output power of the solar energy charger 120 is lower than or equal to the predetermined first power, outputting a fifth PWM signal to control that the solar energy charger 120 enters into the boosting mode to charge the power battery 140 with a micro current.

The controller 150 may be set with a second power, and may be further configured for:

when the input power of the solar energy charger 120 is higher than a second power, controlling the solar energy charger 120 to work;

when the input power of the solar energy charger 120 is lower than or equal to the second power, controlling the solar energy charger 120 to stop working.

As shown in FIG. 1, the double-headed arrows show the signal transmissions between the controller 150 and the solar cell panel 110, the solar energy charger 120, the power battery 140 and the starting battery 130. The single-headed arrows show directions of energy transfer.

The state information of the power battery 140 and the starting battery 130 such as the current quantity of electricity, the voltage, the temperature and so on, may be sampled by a sample circuit located in the controller 150 or an additional sample circuit located in the controller 150. The controller 150 may obtain the current state of the vehicle from a main control Electronic Control Unit (ECU), such as information interaction is realized by a Controller Area Network (CAN) network.

For safety, any person skilled in the art may set the temperature of the entire control system according to certain requirements. When the temperature of the control system is higher than a predetermined temperature, the entire control system is controlled to stop working.

For reasonable utilization of the solar cell panel 110 to generate electricity, the controller 150 may collect a current light intensity. When the light intensity is higher than a predetermined value, the entire control system is controlled to stop working. The technicians in this field may select any kind of method to collect the current light intensity, such as, by a photoresistance, by which, the light signal is converted to a corresponding voltage signal which may be obtained by a sampling module in the controller 150.

The input power and output power of the solar energy charger 120 may be obtained by following methods:

collecting an input voltage, input current, output voltage and output current of the solar energy charger 120;

calculating a product of the input voltage and input current of the solar energy charger 120 to obtain the input power and calculating a product of the output voltage and output current of the solar energy charger 120 to obtain the output power.

The input voltage, input current, output voltage and output current of the solar energy charger 120 may be sampled by a sample circuit located in the controller 150 or an additional sample circuit located in the controller 150.

For convenience to control the solar energy charger 120, and according to the feature of the solar cell panel 110 to generate electricity, the controller 150 has a predetermined first power and a predetermined second power to work as control parameters. The predetermined first power is 45%~55% of the rated power of the solar energy cell panel 110, preferably 50%; and the predetermined second power is 8%~12% of the rated power of the solar energy cell panel 110, preferably 10%.

In the work process of the control system, when the input power of the solar energy charger 120 is lower or equal to the second power, the entire control system is controlled to stop working. At the moment, the solar energy charger 120 may stop charging the power battery 140 or starting battery 130.

Figure 2:
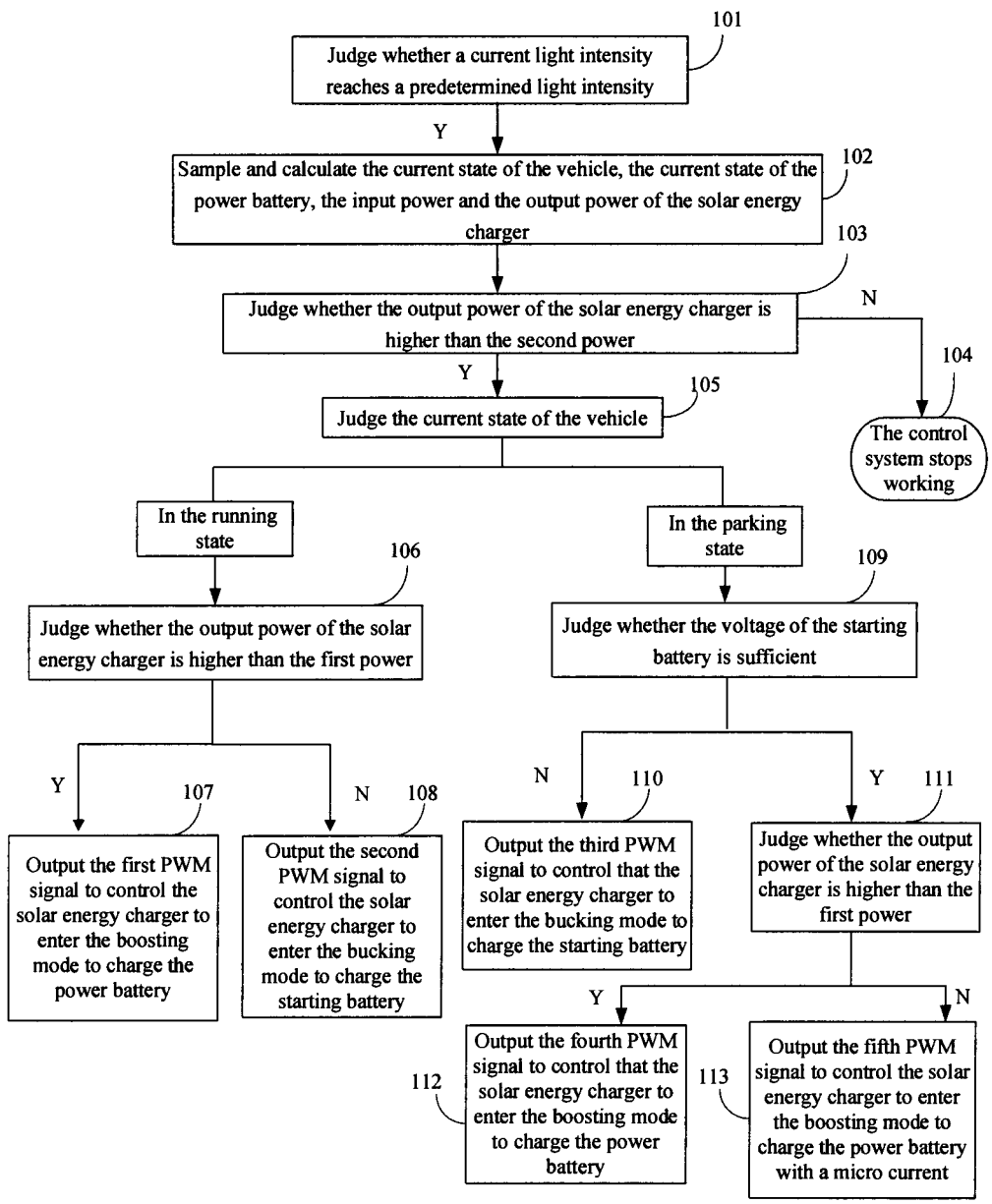
FIG. 2 is a flow chart illustrating a control method of an in-vehicle solar energy charger according to another embodiment of the present invention.

As shown in FIG. 2, another embodiment of the present invention provides a control method of the control system of the in-vehicle solar energy charger, in which, the control method comprises following steps:

1) calculating the input power of the solar energy charger;
2) performing a maximum photovoltaic power tracking algorithm and controlling the output power of the solar energy charger to charge the power battery or starting battery, according to the input power of the solar energy charger.

Furthermore, the control method comprises: controlling the solar energy charger to charge the power battery and starting battery according to the current state of vehicle and the output power of the solar energy charger.

The maximum photovoltaic power tracking algorithm may be realized by any kind of usual method, such as constant-voltage tracking, power feedback method, perturbation and observation control, beeline approximation method, open circuit voltage and short circuit control, etc.

The control method may include:

when the vehicle is in a running state, comparing the output power of the solar energy charger with a predetermined first power, then the solar energy charger is controlled to work according to the comparing result;

when the output power of the solar energy charger is higher than the predetermined first power, outputting a first PWM signal to control that the solar energy charger enters into the boosting mode to charge the power battery.

when the output power of the solar energy charger is lower than or equal to the predetermined first power, outputting a second PWM signal to control that the solar energy charger enters into the bucking mode to charge the starting battery.

Furthermore, the control method may comprise:

when the vehicle is in a parked state, judging whether the voltage of the starting battery is sufficient and controlling the solar energy charge to work according to the judging result;

when the voltage of the starting battery is deficient, outputting a third PWM signal to control that the solar energy charger enters into the bucking mode to charge the starting battery;

when the voltage of the starting battery is sufficient and the output power of the solar energy charger is higher than the predetermined first power, outputting the fourth PWM signal to control that the solar energy charger enters into boosting mode to charge the power battery;

when the voltage of the starting battery is sufficient and the output power of the solar energy charger is lower or equal to the predetermined first power, outputting the fifth PWM signal to control that the solar energy charger enters into a boosting mode to charge the power battery with a micro current.

Furthermore, the control method may comprise:

comparing the input power of the solar energy charger with a predetermined second power, then controlling the solar energy charger to work according to the comparing result;

when the input power of the solar energy charger is higher than the second power, controlling the solar energy charger to work;

when the input power of the solar energy charger is lower than or equal to the second power, controlling the solar energy charger to stop working.

In which, the predetermined first power is 45%~55% of the rated power of the solar energy cell panel and the predetermined second power is 8%~12% of the rated power of the solar energy cell panel.

Furthermore, the control method may further comprise a step of collecting light intensity and controlling the solar energy charger to work according to the light intensity:

when the light intensity reaches a predetermined intensity, controlling the solar energy charger to work;

when the light intensity is lower than the predetermined intensity, controlling the solar energy charger to stop working.

The control method may further comprise a step of detecting the temperature of the control system of the solar energy charger and controlling the solar energy charger to work:

when the detected temperature is higher than a predetermined temperature, controlling the solar energy charger to stop working and to alarm;

when the detected temperature is not higher than the predetermined temperature, controlling the solar energy charger to work.

Generally, when the battery is fully charged, the charging should be stopped. That means, when charging the power battery or the starting battery, if the voltages of the power battery and starting battery reach the rated voltage or reach the full-charge voltage, controlling the solar energy charger to stop charging.

About whether the voltage of the starting battery reaches a full-charge voltage or not, any person skilled in the art may predetermine a suitable full-charge voltage value as the judging standard according to requirements. When the voltage is lower than the predetermined full-charge voltage value, the voltage of the starting battery is deficient. When the voltage is higher than or reaches the predetermined full-charge voltage, the voltage of the starting battery is sufficient.

Charging with a micro current means that the output power of the solar energy charger is not higher than the predetermined first power, the charging current is small.

As shown in FIG. 2, another embodiment of the present invention discloses a control flow of the control system of the in-vehicle solar energy charger:

Step S101, judging whether a current light intensity reaches a predetermined light intensity.

Step S102, if yes in step S101, the current state of the vehicle, the current state of the power battery, the input power and output power of the solar energy charger being sampled and calculated;

Step S103, judging whether the output power of the solar energy charger is higher than the second power, Step S104, if no in step S103, the solar energy charger is controlled to stop working.

Step S105, if yes in step S103, judging whether the vehicle is in a running state or in a parking state.

Step S106, when the vehicle is in a running state, judging whether the output power of the solar energy charger is higher than a predetermined first power, Step S107, if yes in step S106, the controller outputs a first PWM signal to control the solar energy charger into a boosting mode to charge the power battery.

Step S108, if no in step S106, the controller outputs a second PWM signal to control the solar energy charger into a bucking mode to charge the starting battery.

Step S109, when the vehicle is in a parked state, judging whether the voltage of the starting battery is sufficient.

Step S110, if no in step S109, the controller outputs a third PWM signal to control that the solar energy charger enters into the bucking mode to charge the starting battery.

Step S111, if yes in step S110, judging whether the output power of the solar energy charger is higher than the predetermined first power, Step S112, if yes in step S111, the controller outputs a fourth PWM signal to control that the solar energy charger enters into boosting mode to charge the power battery.

Step S113, if no in step S111, the controller outputs a fifth PWM signal to control that the solar energy charger enters into the boosting mode to charge the power battery with a micro current.

The power source of the solar energy charger are solar cell panels and the feature of the solar cell panels may be changed with the change of the temperature and the light intensity. The hardware control method in the prior art is that: controlling a maximum power point (corresponding to the voltage) to a certain value, wherein the maximum power voltages of different solar cell panels differ and are unchangeable after confirming the hardware. Therefore, the current voltage of the solar cell panel is not equal to (such as lower than) the maximum power point voltage, which may exist. Then the solar energy charger may not output the maximum power, having energy loss.

Referring to the control system and control method of the in-vehicle solar energy charger of the present invention, the controller may perform a maximum photovoltaic power tracking algorithm and control the output power of the solar energy charger to charge the power battery or starting battery, according to the input power of the solar energy charger, therefore, it is not needed to replace hardware, only needed to replace the control process. As a result, the control system for an in-vehicle solar energy charger and the control method are flexible and can realize the maximum output of the solar energy.

Additionally, the control system and control method of the in-vehicle solar energy charger of the present invention may rationally control the solar energy charger to work according to the current state of the vehicle and the output power of the solar energy charger, which meet the working condition of the solar energy charger.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A control system for an in-vehicle solar energy charger, comprising:
   at least one solar cell panel,
   a solar energy charger having a control system, the control system including a controller,
   a starting battery and
   a power battery;
   wherein:
   the solar cell plane is electrically connected to the solar energy charger;
   the starting battery and the power battery are electrically connected to the solar energy charger respectively,
   the solar energy charger, the starting battery and the power battery are electrically connected to the controller respectively;
   the controller is configured for performing a maximum photovoltaic power tracking algorithm and controlling the output power of the solar energy charger to charge the power battery or starting battery, according to an input power of the solar energy charger and controlling the solar energy charger to charge the power battery or starting battery according to a current state of a vehicle where the solar energy charger is installed and the output power of the solar energy charger; and
   wherein the controller is set with a predetermined first power and the controller is further configured for controlling the solar energy charger to charge the power battery or starting battery according to a relationship of the output power of the solar energy charger and the predetermined first power.

2. The control system of claim 1, wherein, when the vehicle is in a running state, the controller is configured for:
   when the output power of the solar energy charger is higher than the predetermined first power, outputting a first PWM signal to control that the solar energy charger enters into a boosting mode to charge the power battery; and
   when the output power of the solar energy charger is lower than or equal to the predetermined first power, outputting a second PWM signal to control that the solar energy charger enters into a bucking mode to charge the starting battery.

3. The control system of claim 2, wherein, when the vehicle is in a parked state, the controller is configured for:
   when a voltage of the starting battery is deficient, outputting a third PWM signal to control that the solar energy charger enters into the bucking mode to charge the starting battery;
   when the voltage of the starting battery is sufficient and the output power of the solar energy charger is higher than the predetermined first power, outputting a fourth PWM signal to control that the solar energy charger enters into the boosting mode to charge the power battery; and
   when the voltage of the starting battery is sufficient and the output power of the solar energy charger is lower than or equal to the predetermined first power, outputting a fifth PWM signal to control that the solar energy charger enters into the boosting mode to charge the power battery with a micro current.

4. The control system of claim 3, wherein, the controller is set with a second power, the controller is configured for:
   when the input power of the solar energy charger is higher than the second power, controlling the solar energy charger to work; and
   when the input power of the solar energy charger is lower than or equal to the second power, controlling the solar energy charger to stop working.

5. The control system of claim 4, wherein:
   the control system of the solar energy charger further comprises a photoresistance; and
   the controller is further configured for controlling whether the solar energy charger is working or not according to a light intensity received by the photoresistance.

6. The control system of claim 5, wherein the at least one solar cell panel includes multiple sets of solar cell panels connected in series, each set including multiple solar cell panels connected in parallel.

7. A control method for operating a control system of an in-vehicle solar energy charger, wherein the control system of the solar energy charger comprises a solar energy charger, a power battery and a starting battery, the control method comprising:
   calculating an input power of the solar energy charger; and
   performing a maximum photovoltaic power tracking algorithm and controlling an output power of the solar energy charger to charge the power battery or starting battery, according to the input power of the solar energy charger;
   controlling the solar energy charger to charge the power battery or starting battery according to a current state of a vehicle where the solar energy charger is installed and the output power of the solar energy charger; and
   when the vehicle is in a running state, comparing the output power of the solar energy charger with a predetermined first power, and controlling the solar energy charger according to the comparing result;

when the output power of the solar energy charger is higher than the predetermined first power, outputting a first PWM signal to control that the solar energy charger enters into a boosting mode to charge the power battery; and when the output power of the solar energy charger is lower than or equal to the predetermined first power, outputting a second PWM signal to control that the solar energy charger enters into a bucking mode to charge the starting battery.

8. The control method of claim 7, further comprising:

when the vehicle is in a parked state, judging whether a voltage of the starting battery is sufficient and controlling the solar energy charge to work according to the judging result;

when the voltage of the starting battery is deficient, outputting a third PWM signal to control that the solar energy charger enters into a bucking mode to charge the starting battery;

when the voltage of the starting battery is sufficient and the output power of the solar energy charger is higher than the predetermined first power, outputting a fourth PWM signal to control that the solar energy charger enters into a boosting mode to charge the power battery; and when the voltage of the starting battery is sufficient and the output power of the solar energy charger is lower or equal to the predetermined first power, outputting a fifth PWM signal to control that the solar energy charger enters into a boosting mode to charge the power battery with a micro current.

9. The control method of claim 8, further comprising:

comparing the input power of the solar energy charger with a predetermined second power and controlling the solar energy charger to work according to the comparing result;

when the input power of the solar energy charger is higher than the predetermined second power, controlling the solar energy charger to work; and when the input power of the solar energy charger is lower than or equal to the predetermined second power, controlling the solar energy charger to stop working.

10. The control method of claim 9, wherein, the predetermined first power is 45%~55% of a rated power of the solar energy cell panel and the predetermined second power is 8%~12% of the rated power of the solar energy cell panel.

11. The control method of claim 7, further comprising a step of measuring a light intensity and controlling the solar energy charger to work according to the light intensity:

when the light intensity reaches a predetermined intensity, controlling the solar energy charger to work; and when the light intensity is lower than the predetermined intensity, controlling the solar energy charger to stop working.

12. The control method of claim 7, further comprising a step of detecting a temperature of the control system of the solar energy charger and controlling the solar energy charger according to the detected temperature:

when the detected temperature is higher than a predetermined temperature, controlling the solar energy charger to stop working; and when the detected temperature is not higher than the predetermined temperature, controlling the solar energy charger to work.

13. A control method for operating a control system of an in-vehicle solar energy charger, wherein the control system of the solar energy charger comprises a solar energy charger, a power battery and a starting battery, the control method comprising:

calculating an input power of the solar energy charger; and performing a maximum photovoltaic power tracking algorithm and controlling an output power of the solar energy charger to charge the power battery or starting battery, according to the input power of the solar energy charger;

wherein, the input power and output power of the solar energy charger are obtained by following steps:

collecting an input voltage, input current, output voltage and output current of the solar energy charger; and calculating a product of the input voltage and input current of the solar energy charger to obtain the input power and calculating a product of the output voltage and output current of the solar energy charger to obtain the output power.

14. A control system for an in-vehicle solar energy charger, comprising:

at least one solar cell panel, a solar energy charger having a control system, the control system including a controller, and a power battery;

wherein:

the solar cell panel is electrically connected to the solar energy charger;

the power battery is electrically connected to the solar energy charger respectively, the solar energy charger and the power battery are electrically connected to the controller respectively;

the controller is configured to control the output power of the solar energy charger to charge the power battery according to an input power of the solar energy charger, a current state of a vehicle where the solar energy charger is installed and the output power of the solar energy charger; and wherein the controller is set with a predetermined first power and the controller is further configured to control the solar energy charger to charge the power battery according to a relationship of the output power of the solar energy charger and the predetermined first power.

* * * * *